Patented Apr. 26, 1927.

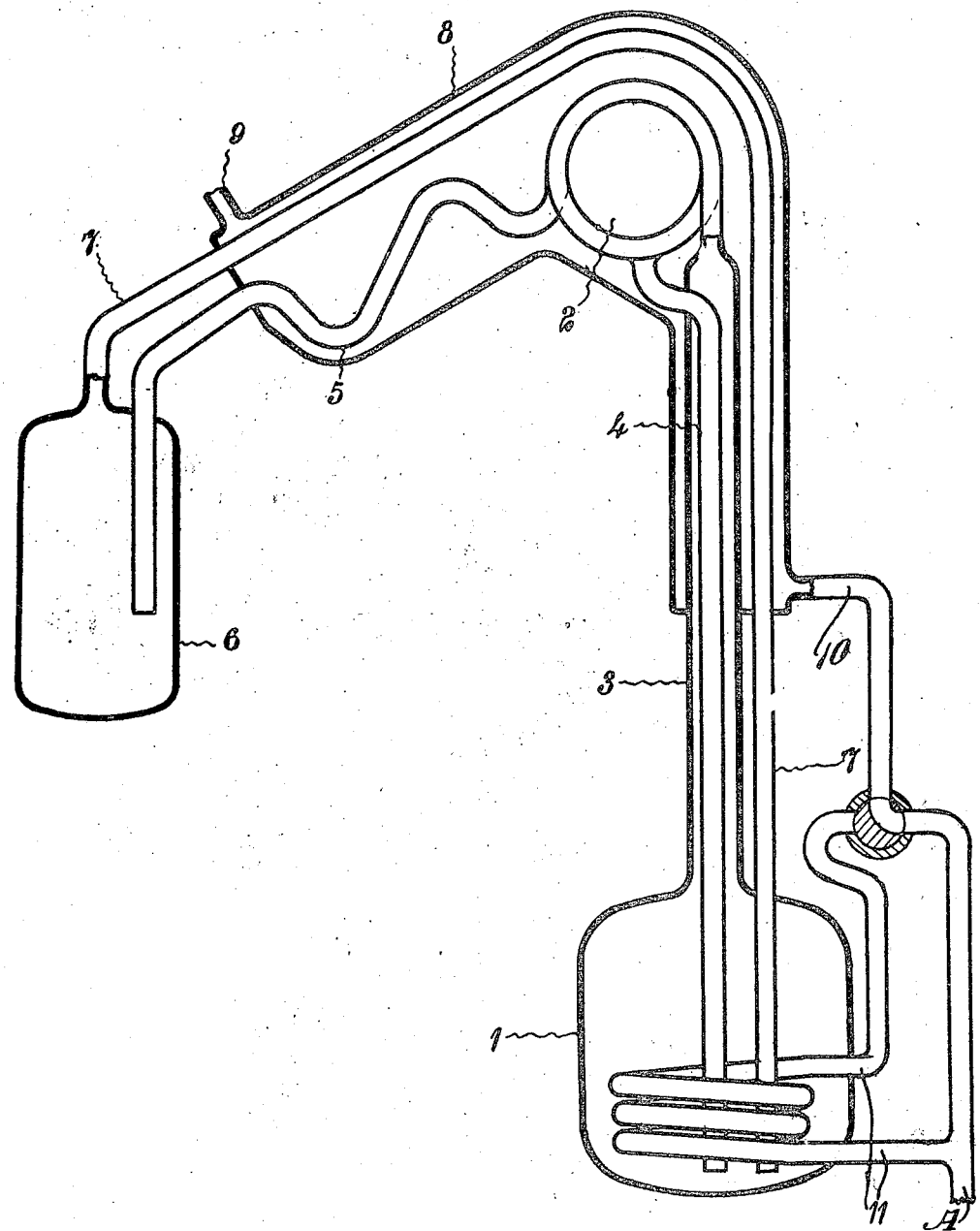

1,626,554

UNITED STATES PATENT OFFICE.

LUDWIG REEHSING, OF BREMEN, GERMANY, ASSIGNOR TO BROR PÖLSSON, OF MALMÖ, SWEDEN.

ABSORPTION REFRIGERATOR.

Application filed April 19, 1926, Serial No. 103,087, and in Germany March 3, 1926.

This invention relates to an absorption refrigerator of the kind in which the boiling of the solution consisting of a refrigerant and water and the refrigeratory action respectively take place periodically, and in which no mechanical means are used to press the refrigerant or the water through the refrigerator apparatus. The refrigerator and especially the parts between the generator-absorber and the evaporator are arranged and combined or interfitted with each other in such manner as to obtain a very simple construction and at the same time a very efficient and economical action.

According to the invention a separator is provided for between the generator-absorber and the evaporator near the generator-absorber and preferably above the latter, the separator being further provided with a direct return conduit for the condensed water vapors to the generator-absorber. Between the separator and the evaporator a device in the form of a liquid trap is fitted and serves as condenser for the refrigerant at the same time accumulating the latter which suddenly or by jerks is pressed out of said device into the evaporator by the pressure in the generator-absorber and separator, which gradually rises to a certain maximum value. In order to facilitate the absorption of the refrigerant evaporated in the evaporator, by the water in the generator-absorber the conduit, through which the vaporized refrigerant passes, is mounted within the cooling water container of the refrigerator, which arrangement assists in further cooling the cooling water, and the generator-absorber itself is provided with a separate cooling device which it put into action, when the heating of the generator-absorber ceases.

The invention is by way of example diagrammatically illustrated on the accompanying drawing.

Between the generator-absorber 1 and the separator 2 is mounted a conduit 3 to guide the vapors of the solution consisting of a refrigerant, for instance ammonia, and water from the generator-absorber to the separator. The separator 2 consists of a tube coil having a plurality of turns and with its axis placed horizontally. A piping 4 leads from a point at the lowest part of the tube coil 2 through the interior of the conduit 3 down to the generator-absorber 1, wherein it opens near the bottom thereof. The piping 4 serves to lead the water condensed in the separator and possibly to a slight extent still mixed with refrigerant directly back to the generator-absorber. By having the piping 4 fitted within the conduit 3 a heat exchanger is obtained, in that the gases issuing from the generator-absorber are thereby somewhat cooled and the water leaving the separator is preheated, which is of advantage for the boiling and separating processes. The last turn of the tube coil of the separator 2 continues in the form of a conduit 5 having two or more knees, which conduit serves as condenser for the refrigerant and in which the liquefied refrigerant gradually accumulates. This conduit 5 opens into the evaporator 6, in which the liquid refrigerant evaporates. A conduit 7 guiding the vaporized refrigerant leads the refrigerant vapors off from the highest point of the evaporator 6 and in passing close by the condenser 5, the separator 2 and the conduit 3 opens into the generator-absorber 1.

A portion of the conduit 3, the greatest portion of the conduit 7, the separator 2 and the condenser 5 are mounted within a common cooling water container 8, into which the cooling water is fed at an upper point thereof such as 9 and from which it is discharged at a lower point such as 10, thus working on the counter current principle. The generator-absorber 1 is further provided with a cooling coil 11 adapted to periodically receive cooling water which may be obtained from the cooling water container 8.

The operation of the refrigerator is as follows:—The refrigerant solution consisting of a refrigerant such as ammonia, and water in the generator-absorber 1 is heated by suitable means such as a gas flame or an electric heating element during a certain period of time during which the cooling coil 11 in the generator-absorber 1 is out of action, that is to say no cooling water is permitted to pass through the same. The gas mixture formed by the heating of the solution passes through the conduit 3 into the separator 2 in which the water vapors condense very much quicker than the vapors of the refrigerant and return, possibly somewhat intermixed with refrigerant, through the piping 4 to the generator-absorber. The refrigerant which gradually condenses accumulates in the knees of the condenser 5.

This process continues, until the returning water and the water in the generator-absorber is practically free from refrigerant which fills the knees of the condenser 5 and which by the pressure in the boiler 1, the conduit 3 and the separator 2 is suddenly or by jerks pressed into the evaporator, the liquid traps in the knees preventing any gas from the evaporator from passing back to the generator-absorber through the separator. When the object of the boiler is completed, that is the refrigerant is wholly evaporated, the heating of the generator-absorber is stopped, which may be accomplished, for instance by means of a thermostatic control device, and the movement obtained thereby may also be utilized for bringing the cooling coil 11 into action. In the evaporator 6 the liquid refrigerant in practically pure condition evaporates and absorbs heat from the room surrounding the evaporator. The gasified refrigerant passes through the conduit 7, which acts as heat exchanger in the cooling water container 8 and thereby effects a further cooling of the cooling water therein, and is discharged into the generator-absorber in which it is very eagerly absorbed by the water, especially on account of the cooling of the latter by the action of the cooling coil 11. The cooling action of the evaporator 6 continues during a relatively long period, at the end of which the process is repeated by heating the contents in the generator-absorber and simultaneously cutting out the action of the cooling coil 11.

What I claim and desire to secure by Letters Patent is:—

1. In a valveless absorption refrigerating apparatus, comprising a closed circulation system having a generator-absorber, separator, condenser and evaporator, the combination of a vapor discharge conduit leading from said generator-absorber to said separator and a water condensate drain conduit leading from said separator to said generator-absorber, said conduits for a part of their length arranged to form a heat interchanger, the water condensate being warmed therein prior to its return to the generator-absorber and the vapor discharge conduit being cooled for effecting preliminary separation of a part of the water in the vapor from said generator-absorber discharged through said conduit.

2. In a valveless absorption refrigerating apparatus, a closed circulation system including a generator-absorber, separator, condenser and evaporator, the generator-absorber being at a relatively low point and the separator at a relatively high point in said system, a vapor discharge conduit leading from said generator-absorber to said separator, a water condensate drain conduit leading from said separator to said generator-absorber, the relative locations of said generator-absorber and separator ensuring drainage into said boiler of water condensed in said separator and in said conduits, the latter for a part of their length arranged to form a heat interchanger, the water condensate being warmed prior to its return to the generator-absorber and the vapor discharge pipe being cooled for effecting preliminary separation of part of the water in the vapor from said generator-absorber discharging through said conduit.

3. In a valveless absorption refrigerating apparatus, a closed circulation system including a generator-absorber, separator, condenser and evaporator, the generator-absorber being at a relatively low point and the separator at a relatively high point in said system, a vapor discharge conduit leading from said generator-absorber to said separator and a water condensate drain conduit leading from said separator to said generator-absorber, the relative locations of said generator-absorber and separator ensuring drainage into said generator-absorber, of water condensed in said separator, and in said conduits, said water condensate return conduit extending within said vapor discharge conduit for a portion of its length forming a heat interchanger, the water condensate being warmed prior to its return to the generator-absorber and the vapor discharge conduit being cooled for effecting preliminary separation of a part of the water in the vapor from said generator-absorber discharge through said conduit, and a cooling water jacket for said heat interchanger.

4. In a valveless absorption refrigerating apparatus of the periodically heated type, comprising a closed circulation system having a generator-absorber, a heat interchanger, separator, condenser, and evaporator arranged serially, said heat interchanger including the vapor discharge pipe from said generator-absorber to said separator and a water condensate drain pipe from said separator to said generator-absorber, the combination of a vapor return pipe from said evaporator to said generator-absorber, sealed by the liquid in said generator-absorber, said condenser having a liquid trap adjacent the inlet end thereof for accumulating a sealing column of liquid refrigerant between the separator and the ulterior part of said condenser.

5. A valveless absorption refrigerating apparatus of the periodically heated type as claimed in claim 4 including a cooling circulation conduit for the condensing portions of said system, and a cooling coil for said generator-absorber, said circulation conduit and coil being in controlled communication with a water supply, means for permitting continuous circulation through said circulation conduit and for periodically establishing a circulation of cooling fluid through said cooling coil.

6. In a valveless absorption refrigerating apparatus, a closed circulation system, including a generator-absorber, separator, condenser and evaporator, the generator-absorber being at a relatively low point and the separator at a relatively high point in said system, a vapor discharge conduit leading from said generator-absorber to said separator, a water condensate drain conduit leading from said separator to said generator-absorber and extending to a point below the liquid level in said generator-absorber, said conduits for a part of their length arranged to form a heat interchanger, the water condensate being warmed prior to its return to the generator-absorber and the vapor discharge pipe being cooled for effecting preliminary separation of part of the water in the vapor from said generator-absorber discharging through said conduit.

7. In a valveless absorption refrigerating apparatus, a closed circulation system including a generator-absorber and evaporator, a separator and condenser connected into a conduit discharging from said generator-absorber to said evaporator, a return conduit from said evaporator to said generator-absorber, a water condensate drain conduit from said separator to said generator-absorber, said last named conduit arranged to form with said discharge conduit a heat interchanger, and a cooling fluid conduit common to said heat interchanger, separator, condenser and return conduit.

In testimony whereof I have signed my name to this specification.

LUDWIG REEHSING.